July 8, 1958     E. F. HUSTON     2,842,720
CIRCUIT CONTROL SYSTEM AND CONTROLLER THEREFOR
Filed Nov. 5, 1953

INVENTOR.
ELMO F. HUSTON
BY
Woodling and Krost,
Attys.

United States Patent Office 2,842,720
Patented July 8, 1958

2,842,720

CIRCUIT CONTROL SYSTEM AND CONTROLLER THEREFOR

Elmo F. Huston, Mansfield, Ohio, assignor to The Ohio Brass Company, Mansfield, Ohio, a corporation of New Jersey Application November 5, 1953, Serial No. 390,357

6 Claims. (Cl. 317—50)

The invention relates in general to a circuit protector system that could be used on various types of electrical equipment but more specifically relates to a direct current system having a rate of current rise sensing device for selective circuit interruption.

The protector systems that are in common use now employ either fuses or circuit brakers which are equipped with instantaneous and sometimes thermal trip devices. Neither of these systems provide completely satisfactory protection since they do not properly differentiate between a normal overload and a cable fault. As a result they often do not open a faulted circuit fast enough to prevent damage or trip when no fault exists. Either of these conditions causes unnecessary delay.

The system of the present invention involves the use of a current rate of rise principle. The advantages have been utilized in some prior art systems by using a rate of rise transformer. A transformer similar to a current transformer would have the primary connected in the load circuit, and the secondary of the current transformer would be used to obtain a tripping impulse for a relay or other control means for the main contacts of the circuit. This prior art rate of rise transformer has the disadvantage that it requires a polarizing means to distinguish between rapid rises and rapid drops in load current. The transformer cannot distinguish between rapid increase or decrease, and it is necessary to polarize the relay so that the circuit will not be interrupted upon rapid decreases of load current.

An object of the invention therefore is to provide a rate of rise current device which has a polarizing means built into the rate of rise protector.

Another object of the invention is to provide a rate of rise circuit protector having a fewer number of parts than formerly.

Another object of the invention is to provide a single circuit element which combines two functions; namely, the rate of rise indication and the self-polarizing feature.

Another object of the invention is to provide a simple circuit protector which opens the circuit upon short circuit or fault currents before such currents reach the maximum current rating of the circuit.

Another object of the invention is to provide a method wherein a circuit is controlled by deriving first and second voltages, the first being indicative of the current in the load and the second being indicative of the rate of change of current in the load.

Another object of the invention is to provide a circuit interrupter which may be used with a coil connected in series with a load to control main contacts such as in a magnetic contactor or circuit breaker.

Another object of the invention is to provide a rate of rise circuit interrupter which is less expensive than the prior art circuit interrupters.

Other objects and a fuller understanding of this invention may be had by referring to the following description and claims, taken in conjunction with the accompanying drawings, in which:

Figure 1:
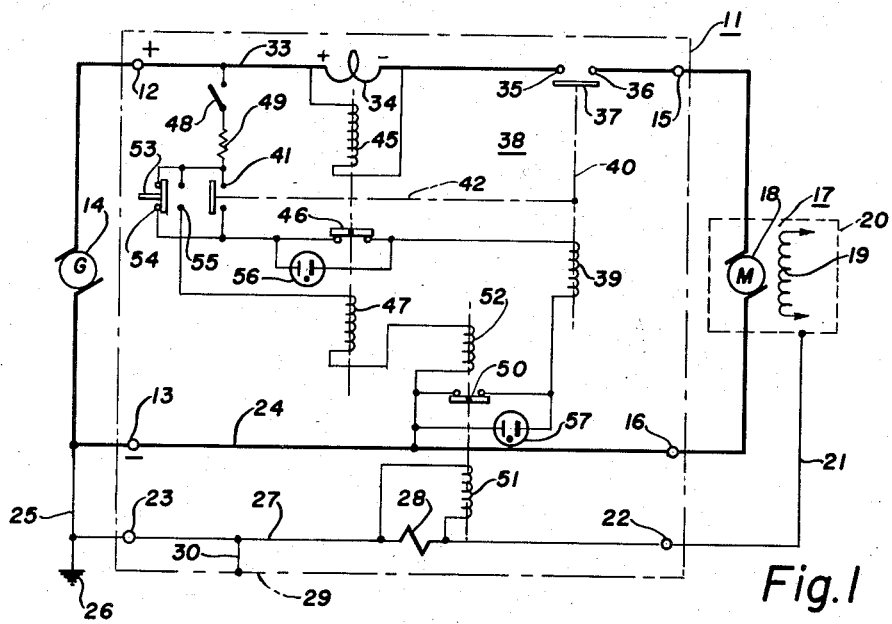
Figure 1 is a schematic diagram of the preferred form of the invention.

The Figure 1 shows a circuit controller 11 which is a selective tripping mechanism. This circuit controller has positive and negative input terminals 12 and 13 which may be energized from any suitable source, such as indicated in the drawing by the generator 14. The controller 11 has positive and negative output terminals 15 and 16 which may be connected to any suitable load, such as that shown in the Figure 1 as a direct current motor 17. The motor 17 has an armature 18 and field 19. The field 19 may be energized from any suitable source such as from the generator 14, however, such energization connections have not been shown. The motor 17 has a frame 20 to which a ground cable 21 is connected for safety purposes such as when the motor is being used in underground mining operations, such as on portable mining machines. Ground cable 21 is connected to a ground output terminal 22 on the controller 11 which also has a ground input terminal 23. The controller 11 has a negative lead 24 extending between the terminals 13 and 16, and this negative lead may be connected to the ground input terminal 23 by a lead 25 and to ground 26. A ground lead 27 extends between the terminals 22 and 23 and includes a shunt 28. The case 29 of the controller 11 may also be grounded as shown at 30.

The circuit controller 11 includes a positive lead 33 extending between the terminals 12 and 15, and this positive lead includes a series blowout coil 34 and main contacts 35 and 36. The main contacts are adapted to be bridged by a blade 37. The main contacts 35—36 are shown in this Figure 1 as part of a magnetic contactor 38 which includes the blowout coil 34 and a magnet or holding coil 39. The blade 37 is opened by gravity and/or spring means and is closed by energization of the holding coil 39. Mechanical interconnection is shown by the dot-dash line 40. The series coil 34 is called a blowout coil since the magnetic circuit thereof cooperates with the magnetic flux of the arc produced at the contacts 35—36 to blow out this arc upon opening of the contacts. Auxiliary contacts 41 are also controlled by the holding coil 39 as shown by the dot-dash line 42.

A trip relay 45 is connected in parallel with the series blowout coil 34. The trip relay 45 actuates to an open condition control contacts 46, and a reset coil 47 is provided to reclose the contacts 46. A control switch 48 is connected in series with a voltage dropping resistor 49, the auxiliary contacts 41, the control contacts 46, the holding coil 39, and ground control contacts 50 across the positive and negative leads 33 and 24, respectively. The ground control contacts 50 are controlled by a ground control relay 51 connected in parallel with the shunt 28. A second reset coil 52 is provided to reclose the ground control contacts 50. A reset switch 53 has normally closed contacts 54 connected in parallel with the auxiliary contacts 41 and has normally open contacts 55 which are closed upon depression of the reset switch button. The reset switch contacts 55 connect in series across the positive and negative leads 33 and 24, the reset coils 47 and 52 through the control switch 48 and voltage dropping resistor 49. A neon indicator lamp 56 is connected across the control contacts 46, and a second neon indicator lamp 57 is connected across the ground control contacts 50.

The motor 17 may be the motor for operation of portable mine machinery which for safety's sake is protected by a ground cable 21 which grounds the frame or case of the machine. The rated current of the motor 17 may be two hundred amperes, for example, which means that upon starting the motor may draw as high as eight hundred or one thousand amperes. The prior art circuit protector devices, whether fuses, circuit breakers, or magnetic contactors, must be designed to protect the mine machinery and the energization circuit and thus would be designed to interrupt the circuit upon sustained overloads or upon short circuits. In the typical short circuit protecting devices now in common use, they would have to be set at a value of one thousand or one thousand two hundred amperes to make certain that the circuit would not be interrupted upon starting current surges. This means that, should a fault occur and short circuit current flow in the circuit, they will reach a value of one thousand or one thousand two hundred amperes before the protective device would open the circuit. The present invention will open the circuit at a much lower value since the trip relay 45 can distinguish between a relatively steep wave front of a short circuit current and the relatively gradual wave front of starting current into the motor. The trip relay 45 is responsive to the rate of change of current through the blowout coil 34. This change of current causes a change of flux, and the change of flux induces an inductive voltage. The change of flux and inductive voltage are both directly proportional to the rate of change of load current. The series blowout coil 34 will be of relatively few turns of heavy gauge conductor in order to pass the total motor current. Also, only a few number of turns are required to generate the flux used in the arc blowout feature. The trip relay coil 45 on the other hand will be wound of a large number of turns of small diameter conductor, and thus with an increasing current to the motor 17 the increase in flux through the blowout coil 34 will cause a rapid increase of induced voltage. The trip relay 45 is a voltage responsive relay which is responsive to this induced voltage and hence will open the control contacts 46.

The system is placed in operation by closing the control switch 48 and depressing the reset button 53. This energizes the reset coils 47 and 52 to make certain that the control contacts 46 and ground control contacts 50 are closed. This provides an energization path for the holding coil 39 and thus closes the main contacts 35—36. Motor current is thus supplied to the motor 17. This motor current will have a resistive drop or I. R. drop across the series coil 34. As indicated in the schematic diagram of Figure 1, this I. R. drop will be positive on the left side. This resistive voltage drop is passed to the trip relay coil 45 and is a novel feature of the invention in that it provides a self-polarizing means. The blowout coil 34 will develop an induced voltage for changing currents to the load 17. These induced voltages will be positive on the left side of the coil 34 for increasing currents to the load and will be positive on the right side of the coil 34 for decreasing currents to the load. It will thus be noted that the I. R. drop voltage and the induced voltage for increasing currents to the load are in the same sense. This is the self-polarizing feature of the invention. With a given voltage applied to the trip relay 45 in accordance with the I. R. drop, then an inductive voltage also applied to this trip relay in the same sense from short circuit or fault currents will be enough to open the control contacts 46 to in turn open the main contacts 35—36.

Only a small percentage of the load current goes through the trip relay coil 45 whereas the majority of the current goes through the blowout coil 34. If the load current is gradually increased, the percentage of current flowing through the relay coil would remain constant. If, however, the increase of load current is rapid, such as for fault currents, a greater percentage of current would flow through the relay coil because of the relatively high inductance of the blowout coil. Because of the inductance of this blowout coil 34, the voltage across it will be a function of the rate of rise of the load current. Therefore, the trip relay 45 connected in parallel with this blowout coil is sensitive to the voltage across this blowout coil.

The circuit of Figure 1 shows another means for opening the main contacts 35 and 36, and this means is the ground control relay 51. The shunt 28 is connected in the ground lead 27; and thus if any fault currents flow through the ground cable which normally carries no current, a voltage will be developed across the shunt 28. This voltage is applied to the ground control relay 51 to open the ground control contacts 50 and thus de-energize the holding coil 39. This feature is more fully described in the copending application filed September 28, 1953, Serial No. 382,681, entitled "Circuit Interrupter." The neon indicator lamps 56 and 57 will give an indication as to which control contacts have opened, either 46 or 50, and thus give an indication as to the type of fault, whether short circuit or ground current fault. The indicator lamps 56 and 57 may also be located at some remote position as may be the reset switch 53 for remote operation of the circuit controller 11.

Figure 2:
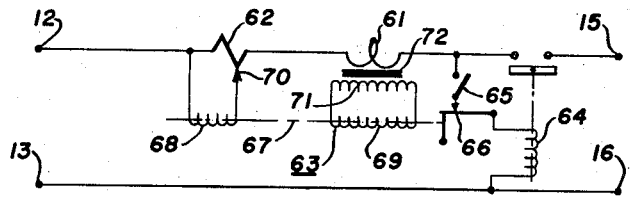
Figure 2 is a modified schematic drawing.

The Figure 2 shows a modified form of circuit controller wherein a series coil 61 is used to derive an inductive voltage drop, and a series resistance 62 is used to derive a resistive voltage drop. It will thus be noticed that the two features of the series blowout coil 34 have been separated into two separate impedances. In the circuit of Figure 2 an electromagnetic relay means 63 controls the energization of a holding coil 64. The holding coil 64 is energized through a control switch 65 and control contacts 66 which are connected in series with the holding coil 64 across the positive and negative leads. The relay means 63 has a movable armature indicated at 67 which trips to an open condition the control contacts 66 upon energization of the relay means 63. This relay means has first and second relay coils 68 and 69. The first relay coil 68 is connected across at least a part of the series resistance 62 as diagrammatically indicated by the variable slider 70. The second relay coil 69 is connected to the secondary 71 of a transformer 72. The series coil 61 forms the primary of this transformer. The series resistance 62 develops a first voltage indicative of the current in the load connected to the terminals 15 and 16 and thus develops a first flux or magnetomotive force in the relay means 63. The series coil 61 develops a voltage indicative of the change of current in the load and passes this to the relay means to develop a second flux or magnetomotive force in the core thereof. These two magnetomotive forces combine to establish a combined magnetomotive force and, hence, a combined force which acts upon the armature 67 to trip the control contacts 66. The series resistance 62 is thus the polarizing means which is derived in accordance with the load current. Again, the force obtained from the resistive voltage drop and the inductive voltage drop for increasing currents into the load will be in the same sense.

Figure 3:
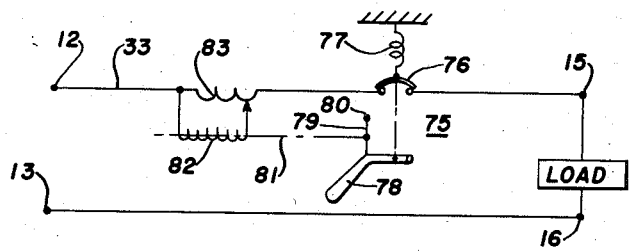
Figure 3 is a schematic diagram of a third modification.

The Figure 3 shows a modification wherein the rate of rise controller controls a circuit breaker 75. This circuit breaker has main contacts 76 diagrammatically shown as being urged to the open condition by spring means 77. A handle 78 is provided to close the contacts 76. A trip lever 79 is pivoted at 80 and controlled by an armature 81. The armature 81 is surrounded by a trip relay coil 82 connected in parallel with at least a part of a series coil 83. This series coil 83 is connected in series in the positive lead 33 and may serve the function of an arc blowout coil if desired. Again in this circuit of Figure 3 the resistive voltage drop and the inductive voltage drop for increasing currents to the load across the series coil 83 will be additive and thus the resistive voltage drop is a self-polarizing feature. The combination of these two voltages again controls the load current by interrupting the main contacts 76.

The rate of rise circuit controller of the present invention materially reduces the cost of the prior art rate of rise circuit protector which used a modified current transformer plus a separate polarizing means such as a separate coil and direct current source. As shown in Figures 1 and 3, the series coil 34 or 83 produces an inductive voltage dependent upon current change, and the same coil also provides a self-polarizing means from the resistive voltage drop.

A gradual increase in load current will produce very little induced voltage, but the I. R. drop across the series coil 34 can be used to energize the relay coil 45 and thus open the main contacts 35—36 at a given value of load current. This is an advantage of this new circuit over the prior art rate of rise system using a transformer since with the latter no voltage is produced in the trip circuit if the load current is increased gradually. Protection against these slowly increasing load currents must then be provided by other means in these prior art circuits. Another feature of the invention is that the resistance of the blowout coil 34 tends to increase as it becomes hot as a result of carrying the load current for a prolonged period. The trip relay will open with a lower value of gradually increasing load current if the blowout coil is hot than if it is cold.

The series blowout coil 34 and the trip relay 45 thus together achieve a rate of rise protective device which includes all the functions of the prior art current transformer having primary and secondary windings energizing a relay winding and with the relay having an auxiliary polarizing winding energized from a battery or equivalent source. Thus, two coils take the place of four coils and a voltage source and materially reduces the cost of the complete circuit protector and reduces the likelihood of failure by reducing the number of parts.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A selective tripping system in an electrical direct current load circuit including, a circuit interrupting device having a series coil, a shunt coil and main contacts on said device, said shunt coil controlling said main contacts, a trip relay connected directly in shunt with said series coil to control said main contacts by a predetermined increased energization of said trip relay, normally closed control contacts on said trip relay, means for connecting in series in the positive lead of said direct current circuit said series coil and said main contacts, and means for connecting in series across the positive and negative leads of said direct current circuit said control contacts and said shunt coil, the I. R. drop across said series coil being in the same sense as the induced voltage caused by increasing currents into said load circuit.

2. The invention in accordance with claim 1 with means including a reset device for closing the trip relay control contacts after actuation thereof.

3. A selective tripping system in an electrical direct current load circuit including, a magnetic contactor having an arc blowout coil, a holding coil and normally open main contacts on said magnetic contactor, a trip relay connected directly in shunt with said blowout coil to control said main contacts by a predetermined increased energization of said trip relay, normally closed control contacts on said trip relay, means for connecting in series in the positive lead of said direct current circuit said blowout coil and said main contacts, and means for connecting in series across the positive and negative leads of said direct current circuit said control contacts and said holding coil, the I. R. drop across said blowout coil being in the same sense as the induced voltage caused by increasing currents into said load circuit.

4. The invention in accordance with claim 3 with means including a reset device for closing the trip relay after actuation thereof, the said reset device having a pair of normally closed contacts connected in series with said control contacts and said holding coil to prevent closing of the said main contacts when the reset device is actuated.

5. A selective tripping circuit breaker for use with a direct current source and a direct current load, comprising, first and second power conductors and a ground conductor, terminal means for connecting each of said conductors to said source and to said load, main contacts connected in said first conductor, spring means to open said contacts, a holding coil energizable to close said contacts, a blowout coil connected in series in said first conductor and magnetically associated with said main contacts to cooperate with the flux of any arc at said main contacts to aid in extinguishing such arc, a short circuit relay having control contacts and having a trip coil connected in parallel with said blowout coil, a shunt in said ground conductor, a ground current relay having control contacts and having an operating coil connected in parallel with said shunt, a starting switch, and means to connect in series said starting switch, said short circuit relay control contacts, said holding coil, and said ground current relay control contacts between said first and second conductors.

6. The invention in accordance with claim 5 with means including a reset device for closing the two control contacts after actuation thereof.

References Cited in the file of this patent

UNITED STATES PATENTS

| | | |
|---|---|---|
| 1,184,846 | Fortescue | May 30, 1916 |
| 1,427,369 | Fortescue | Aug. 29, 1922 |
| 1,671,471 | Fortescue | May 29, 1928 |
| 1,685,949 | Fortescue | Oct. 2, 1928 |
| 1,730,881 | Fortescue | Oct. 8, 1928 |
| 2,276,675 | Scott | Mar. 17, 1942 |
| 2,637,843 | Kammerdiener | May 5, 1953 |

FOREIGN PATENTS

| | | |
|---|---|---|
| 644,649 | France | Oct. 11, 1928 |